United States Patent [19]
Kim

[11] Patent Number: 6,018,377
[45] Date of Patent: Jan. 25, 2000

[54] STORAGE CAPACITOR WITH DIELECTRIC LAYER COMPRISING PARTICULAR MATERIALS

[75] Inventor: Woong-Kwon Kim, Anyang, Rep. of Korea

[73] Assignee: LG Electronics Inc., Seoul, Rep. of Korea

[21] Appl. No.: 08/742,967

[22] Filed: Nov. 1, 1996

[30] Foreign Application Priority Data

Feb. 3, 1996 [KR] Rep. of Korea ............... 96/2588

[51] Int. Cl.$^7$ ............... G02F 1/1333; G02F 1/1393; G02F 1/136
[52] U.S. Cl. ............... 349/38; 349/43; 349/138
[58] Field of Search ............... 349/38, 43, 42, 349/13 E

[56] References Cited

U.S. PATENT DOCUMENTS 5,028,122  7/1991  Hamada et al. ............... 349/38
5,374,570  12/1994  Nasu et al. ............... 437/40

FOREIGN PATENT DOCUMENTS 3-129321  6/1991  Japan.

Primary Examiner—William L. Sikes
Assistant Examiner—Toan Ton
Attorney, Agent, or Firm—Morgan, Lewis & Bockius LLP

[57] ABSTRACT

A liquid crystal display device and method for manufacturing thereof include a gate electrode and a gate bus line over a substrate. An insulating layer, including at least one of PbOx, Bi2O3, BaO, SrO, TiO2, Nb2O5, ZnO, Zr2O3, and MgO, is formed over the gate electrode, the gate bus line, and the substrate. A semiconductor layer is formed on the insulating layer over the gate electrode, and an ohmic contact layer having first and second portions is formed on the semiconductor layer. Source and drain electrodes are formed on the first and second portions of the ohmic contact layer, respectively, and a pixel electrode is formed contacting the drain electrode and over the insulating layer. The gate bus line, the insulating layer, and the pixel electrode form a capacitor.

28 Claims, 4 Drawing Sheets

STORAGE CAPACITOR WITH DIELECTRIC LAYER COMPRISING PARTICULAR MATERIALS

BACKGROUND OF THE INVENTION

1. Field of the Invention

The present invention relates to a capacitor, and more particularly, to a storage capacitor for a liquid crystal display (LCD) device and method for manufacturing the same.

2. Discussion of the Related Art

In general, there are two kinds of LCD devices. One type uses active driving elements and the other type uses passive driving elements. An LCD device which includes a substrate having thin film transistors (TFTs) in an array of rows and columns as active switching elements is called an active matrix liquid crystal display (hereinafter "AMLCD") device. In AMLCD devices, two substrates are joined which face one another. One substrate has multiple TFTs in a matrix arrangement and the other substrate has a color filter. A liquid crystal material is injected between the two substrates.

FIG. 1 is a plan view of the active matrix substrates having the TFTs and FIG. 2 is a cross-sectional view of FIG. 1 taken along line I–I'

Referring to FIGS. 1 and 2, an active matrix substrate for a liquid crystal display device of the present invention includes a plurality of gate bus lines 2 and a plurality of source bus lines 3 that are formed such that they cross each other over an insulating substrate 1. A pixel area is formed surrounded by the gate bus line 2 and the source bus line 3. A TFT 4 is located at an intersection of the gate and source bus lines.

Referring to FIG. 2, a gate electrode 12 and a gate bus line 2 are formed on a substrate 1 and then anodized to form an oxide layer 11. A gate insulating layer 15 is formed over the gate electrode 12, gate bus line 2, and the substrate 1. A semiconductor layer 16 is formed over the gate insulating layer 15 and an ohmic contact layer 17 is formed over the semiconductor layer 16. Source and drain electrodes 13 and 5 are formed over the ohmic contact layer 17. A pixel electrode 10 is then formed to contact the drain electrode 5 and over the gate insulating layer 15.

A light shielding film as wide as the TFT is formed in a mesh structure to protect the TFT from being exposed to light. Then, the aperture of the light shielding film is aligned with the pixel area. Thus, the TFT 4, the gate bus line 2, and the source bus line 3 are covered with the light shielding film. The light shielding film can be formed on any side of the two substrates. In the TFT 4, a gate electrode 12 is connected to the gate bus line 2, and a source electrode 13 is connected to the source bus line 3. The pixel electrode 10 is formed at the pixel area and as wide as the pixel area. The drain electrode 5 is connected to the pixel electrode 10. A common electrode 22 (FIG. 3) is formed on the substrate having the color filter, which faces the active matrix substrate. A liquid crystal capacitor C is formed between the common electrode 22 and the pixel electrode 10.

When the TFT 4 is turned ON by the signal supplied to the gate electrode 12 through the gate bus line 2, the data signal supplied to the source electrode 13 through the source bus line 3 is induced to the pixel electrode 10. In such a case, the liquid crystal is driven by the conducted charge at the liquid crystal capacitor. When the TFT is turned OFF, the conducted charge at the liquid crystal capacitor remains until the next signal through the gate bus line 2 is supplied again to the gate electrode 12. However, in that case, the source electrode 13 and the drain electrode 5 are not perfectly insulated and becomes similar in condition to a high resistance material even though the TFT 4 is OFF. Accordingly, the conducted charge slowly leaks out from the liquid crystal capacitor as time passes. In order to prevent this problem, refreshing cycles are needed for recharging of the liquid crystal capacitor at specific time intervals. In addition, the capacitor C has to be larger in order to reduce the number of refreshing cycles. For such reasons, a storage capacitor Cs is formed in parallel with the liquid crystal capacitor C to help keep the amount of the conducted charge of the pixel electrode 10. FIG. 3 is an equivalent circuit diagram of the TFT 4, the liquid crystal capacitor C, and the storage capacitor Cs.

For the AMLCD manufactured by using a conventional method as mentioned above, in order to maintain a bright contrast with a small power consumption, the ratio of aperture, i.e., the ratio of the area of the pixel electrode 10 compared to the area covered by the light shielding film, should be increased as much as possible. To increase the ratio of the pixel aperture, the pixel electrode 10 should be enlarged while the area covered by the light shielding film should be reduced as small as possible.

When the light shielding film is reduced, the size of the TFT 4 should also be reduced as well as the width of the gate bus line 2 and the width of the source bus line 3. In doing so, the size of the storage capacitor 23 is reduced accordingly and the conducted charge is not sufficiently maintained to supplement the charge leakage. Therefore, in order to make the active matrix elements as small as possible while insuring a desired capacitance of the storage capacitor, a thin film may be used for the insulating layer, a material having a large dielectric value may be used, or the capacitance area of the storage capacitor may be enlarged by employing a stacked layer structure.

However, the conventional methods have the following problems. First, because the distance between the pixel electrode 10 and the gate bus line 2 is short, the charge leakage may increase or an overheating may occur when the insulating layer is formed with a thin film. Second, when a material having a large dielectric value is used, the quality of such material is worse than SiO or SiN. Third, when a stacked layer is used as the structure of the storage capacitor, a line-open occurs frequently because the process and the step-coverage become more complicated.

SUMMARY OF THE INVENTION

Accordingly, the present invention is directed to method for manufacturing a storage capacitor for a liquid crystal display that substantially obviates one or more of the problems due to limitations and disadvantages of the related art.

An object of the present invention is to provide a method for manufacturing the storage capacitor for a liquid crystal display that improves its reliability and density.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a method for manufacturing a liquid crystal display device comprises the steps of forming a gate electrode and a gate bus line over a substrate; forming an insulating layer, including at least one of PbOx, $Bi_2O_3$, BaO, SrO, $TiO_2$, $Nb_2O_5$, ZnO, $Zr_2O_3$, and MgO, over the gate electrode, the gate bus line, and the substrate; forming a semiconductor layer on the insulating layer over the gate electrode; forming an ohmic contact layer having first and second portions on the semiconductor layer; forming source and drain electrodes on the first and second portions of the ohmic contact layer, respectively; forming a pixel electrode contacting the drain electrode and over the insulating layer, wherein the steps of forming the gate bus line, the insulating layer, and the pixel electrode form a capacitor.

In another aspect, the present invention provides a liquid crystal display device comprising a substrate; a gate electrode and a gate bus line over the substrate; an insulating layer, including at least one of PbOx, $Bi_2O_3$, BaO, SrO, $TiO_2$, $Nb_2O_5$, ZnO, $Zr_2O_3$, and MgO, over the gate electrode, the gate bus line, and the substrate; a semiconductor layer on the insulating layer over the gate electrode; an ohmic contact layer having first and second portions on the semiconductor layer; source and drain electrodes on the first and second portions of the ohmic contact layer, respectively; a pixel electrode contacting the drain electrode and over the insulating layer, wherein the gate bus line, the insulating layer, and the pixel electrode form a capacitor for the liquid crystal display.

In another aspect, the present invention provides a method for manufacturing a storage capacitor for a liquid crystal display device comprising the steps of forming a first electrode; forming a second electrode; forming a dielectric layer between the first and second electrodes, the dielectric layer including at least one of PbOx, $Bi_2O_3$, BaO, SrO, $TiO_2$, $Nb_2O_5$, ZnO, $Zr_2O_3$, and MgO.

In another aspect, the present invention provides a storage capacitor for a liquid crystal display device comprising a first electrode; a second electrode; a dielectric layer between the first and second electrodes, the dielectric layer including at least one of PbOx, $Bi_2O_3$, BaO, SrO, $TiO_2$, $Nb_2O_5$, ZnO, $Zr_2O_3$, and MgO.

In a further aspect, the present invention provides a structure and method for manufacturing a storage capacitor, which is constructed by inserting an insulating layer between a pixel electrode and a gate bus line. The insulating material is an amorphous material selected from the group consisting of PbOx, $Bi_2O_3$, BaO, SrO, $TiO_2$, $Nb_2O_5$, ZnO, $Zr_2O_3$, MgO and a combination of these materials.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together description serve to explain the principles of the invention.

In the drawings.

DESCRIPTION OF THE PREFERRED EMBODIMENTS

Reference will now be made in detail to the preferred embodiments of the present invention, examples of which are illustrated in the accompanying drawings.

First Preferred Embodiment

Figure 1:
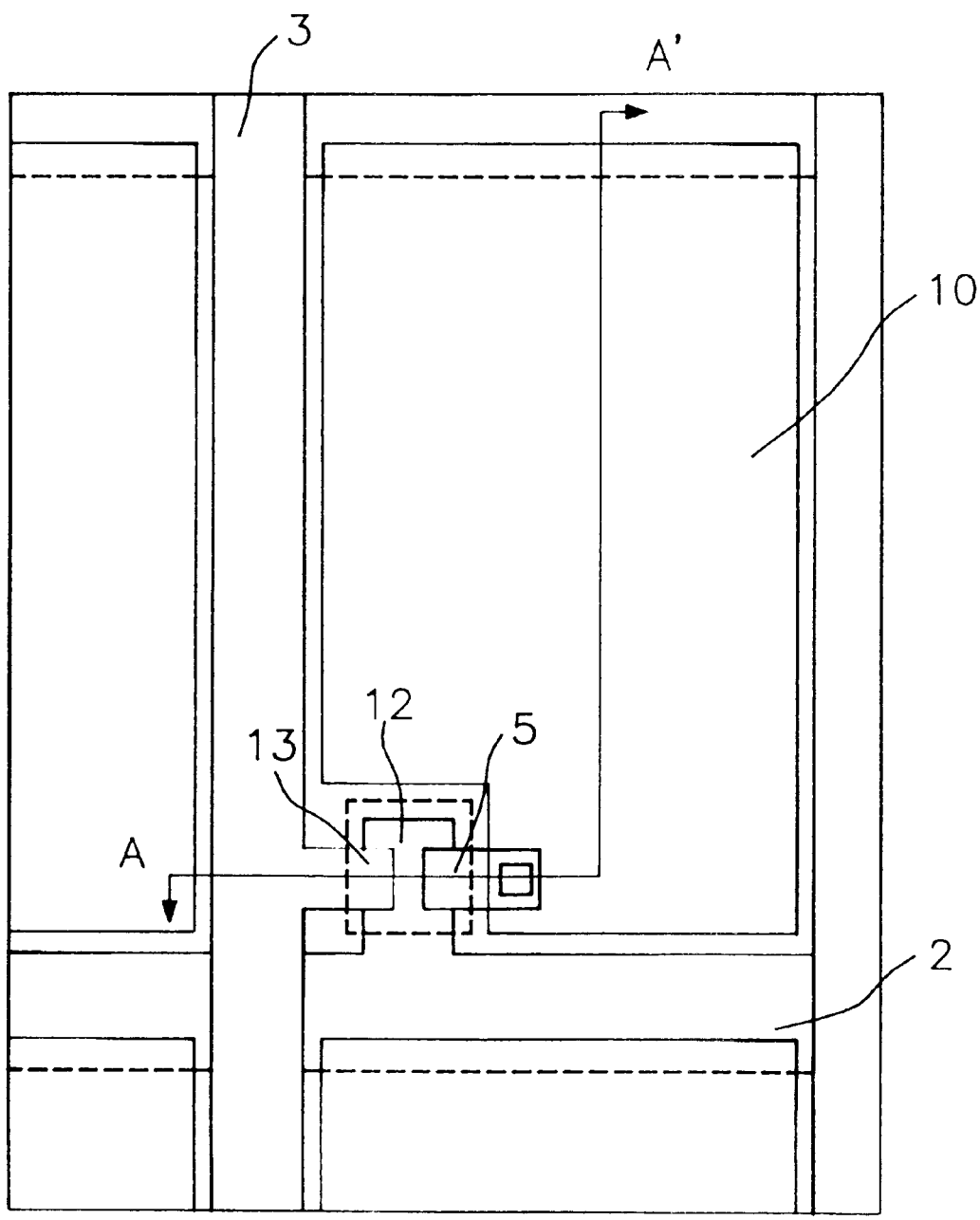
FIG. 1 is a plan view of a conventional active matrix substrate.
Figure 2:
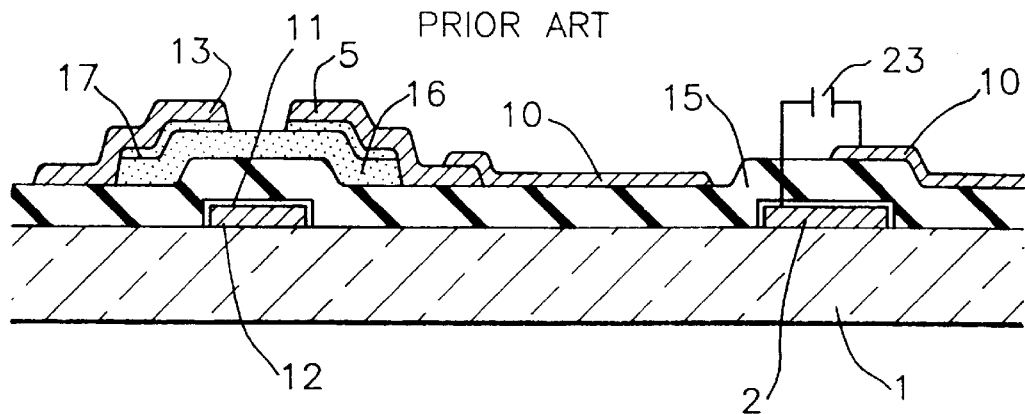
FIG. 2 is a cross-sectional view of a display cell taken along line I—I of FIG. 1.
Figure 3:
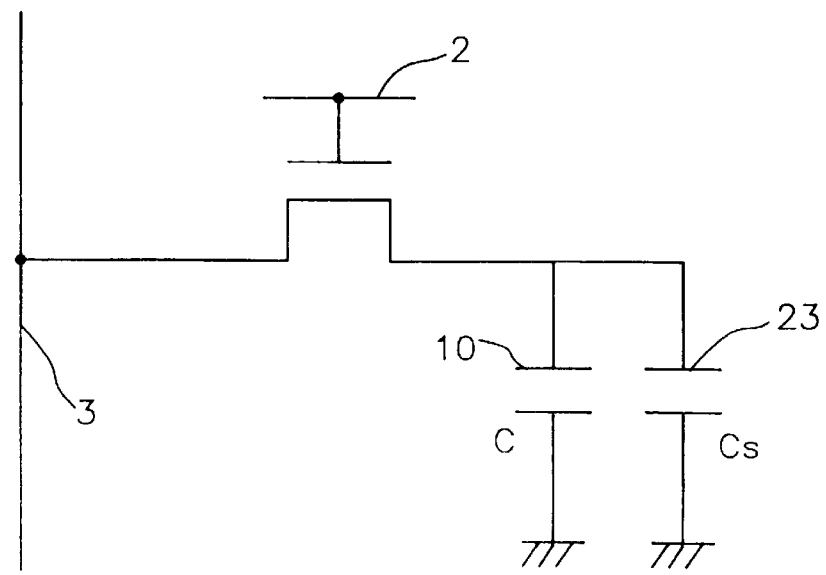
FIG. 3 is an equivalent circuit diagram of FIG. 1.
Figure 4A:
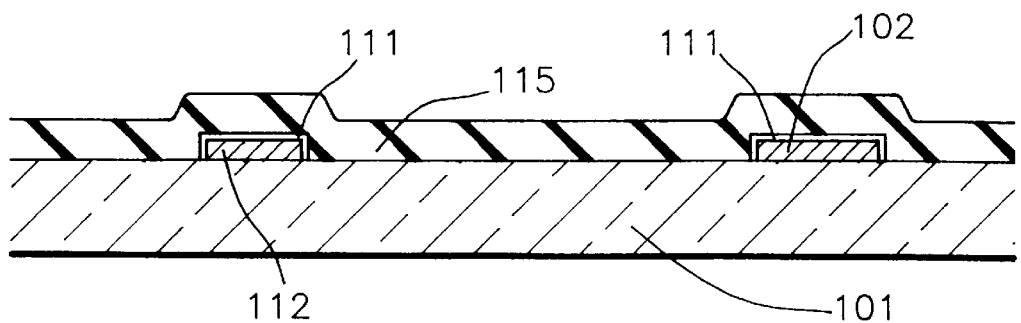
FIGS. 4A–4C are schematic cross-sectional views illustrating a process for manufacturing an AMLCD of the present invention.
Figure 4B:
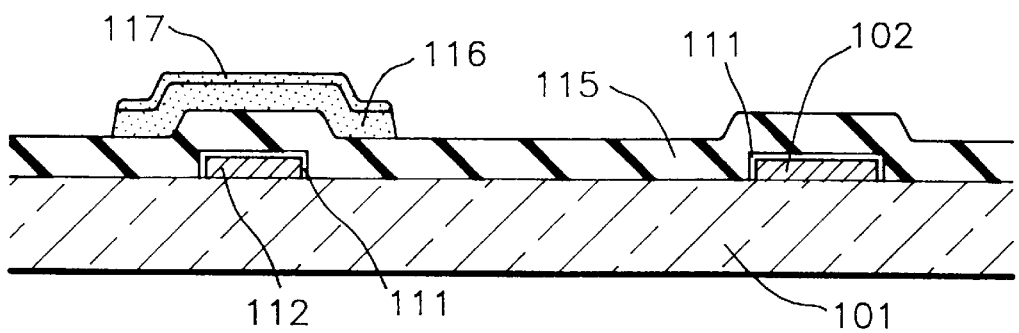
Figure 4C:
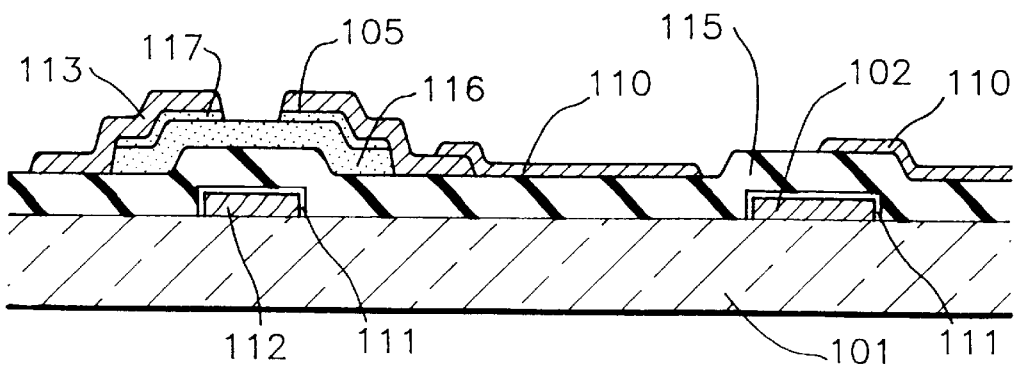

Referring to FIGS. 4A–4C, a plurality of gate bus lines 102 made of A1, for example, is arrayed in parallel with each other on an insulating substrate 101, from which a gate electrode 112 branches off. After the gate bus line 102 and the gate electrode 112 are anodized forming an oxide layer 111, an insulating material including PbOx, $Bi_2O_3$, BaO, SrO, $TiO_2$, $Nb_2O_5$, ZnO, $Zr_2O_3$, MgO, or equivalents is laminated. The insulating material may be a combination of the materials listed above.

On the insulating layer 115, amorphous silicon layer (hereinafter "semiconductor") and olunic contact layer (n+a-Si) are deposited sequentially, and patterned by photolithography to form a semiconductor layer 116 and an ohmic contact layer 117. A Ti metal layer is formed on the whole surface of the substrate 101 by sputtering. The Ti metal layer is etched to form a source bus line 103 which functions as the signal line. A source electrode 113 branches off from the source bus line 103, and a drain electrode 105 functions as the output electrode. The drain electrode 105 is electrically connected to the pixel electrode 110, which is formed within the pixel area. A plurality of the source bus lines 103 is formed perpendicular to a plurality of the gate bus lines 102 on the insulating layer 115. Thus, at each pixel area surrounded by the gate bus line 102 and the source bus line 103, a TFT 104 and a pixel electrode 110 are formed. The pixel electrode 110 also has an overlapped area with some parts of the gate bus line 102 and the insulating layer 115 is inserted between them as shown in FIG. 4C. This area plays a role of the storage capacitor 123.

Second Preferred Embodiment

Figure 5A:
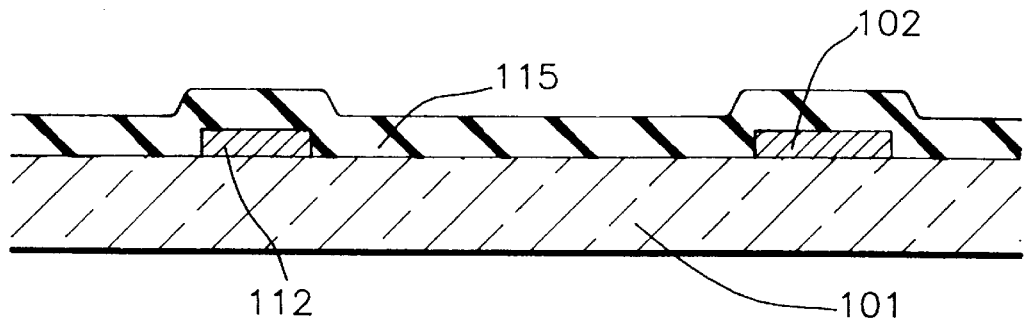
FIGS. 5A–5C are schematic cross-sectional views illustrating an another process for manufacturing an AMLCD of the present invention.
Figure 5B:
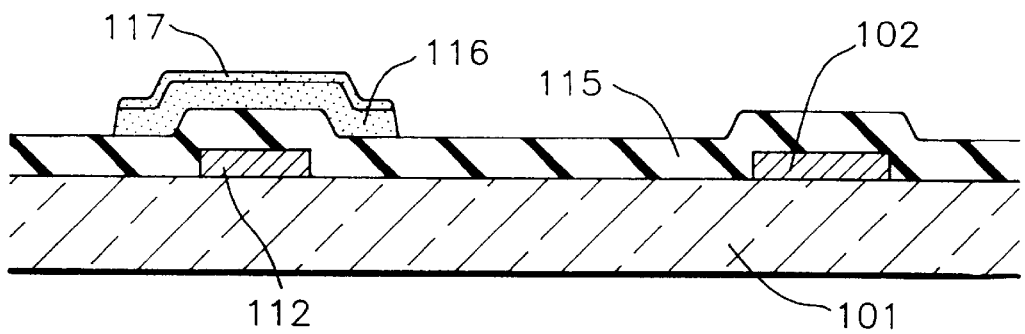
Figure 5C:
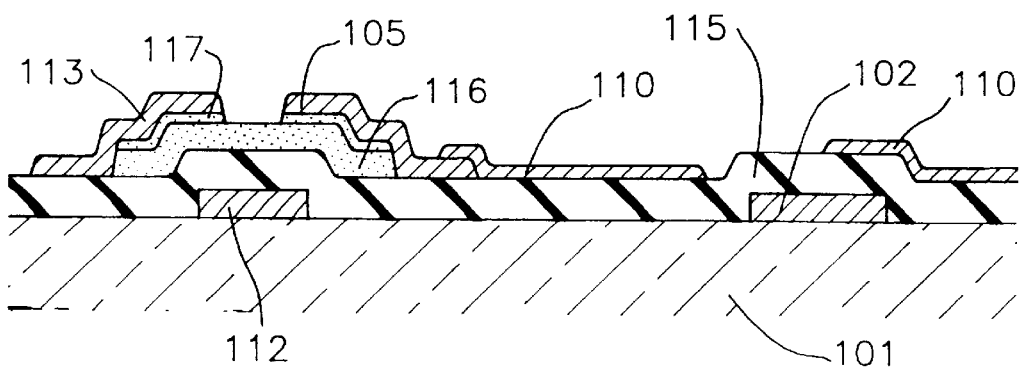

Referring to FIGS. 5A–5C, a plurality of gate bus lines 102 made of Cr, for example, is arrayed in parallel with each other on an insulating substrate 101, from which a gate electrode 112 branches off. On the substrate 101, an insulating material including PbOx, $Bi_2O_3$, BaO, SrO, $TiO_2$, $Nb_2O_5$, ZnO, $Zr_2O_3$, MgO, or equivalents is laminated to cover the gate electrode 112 and the gate bus lines 102. The insulating material may be a combination of the materials listed above.

On the insulating layer 115, amorphous silicon layer (hereinafter "semiconductor") and ohmic contact layer (n+a-Si) are deposited sequentially, and patterned by photolithography to form a semiconductor layer 116 and an ohmic contact layer 117. A metal layer such as Ti is formed on the whole surface of the substrate 101 by sputtering. The metal layer is etched to form a source bus line which finctions as the signal line. A source electrode 113 branches off from the source bus line, and a drain electrode 105 functions as the output electrode. The drain electrode 105 is electrically connected to the pixel electrode 110, which is formed in the pixel area A plurality of the source bus lines is formed perpendicular to a plurality of the gate bus lines 102 on the insulating layer 115. Thus, at each pixel area surrounded by the gate bus line 102 and the source bus line, a TFT 104 and a pixel electrode 110 are formed. The pixel electrode 110 also has an overlapped area with a portion of the gate bus line 102 and separated by the insulating layer 115 between them as shown in FIG. 5C. This area plays a role of the storage capacitor.

In the preferred embodiments of the present invention, the material used for the insulating layer 115 preferably includes PbOx, $Bi_2O_3$, BaO, SrO, $TiO_2$, $Nb_2O_5$, ZnO, $Zr_2O_3$, MgO, or their equivalents. A compound including a combination of these materials may also be used in accordance with the present invention. While it is desirable to use a material having a large dielectric value, according to the equation $C=e*S/D$, such materials generally have relatively bad quality and larger charge leakage than SiO or SiN. In the present invention, such disadvantages are overcome by constructing a storage capacitor 123 using the insulating layer with materials disclosed above, which have better quality, smaller charge leakage, and larger dielectric value than any other material.

Accordingly, the present invention provides a storage capacitor having a capacitance large enough to supplement the storage capacitance even though its size is smaller than conventional devices because the insulating layer of the present invention has a large dielectric value with high quality and small charge leakage. Also, because aperture ratio is higher while the area covered by the light shielding film is smaller in the present invention, it is possible to make the elements of the TFT and each bus line more precisely and to reduce the step coverage of the insulating layer by reducing the thickness.

Accordingly, the present invention provides several methods for manufacturing a storage capacitor for a liquid crystal display device and method including thin film transistor and cell capacitor as switching elements for driving the liquid crystal. The liquid crystal display device is manufactured by using such a method. Moreover, the present invention provides a method for manufacturing a storage capacitor that overcomes charge leakage problem and supplement the cell capacitor.

It will be apparent to those skilled in the art that various modifications and variations can be made in the method for manufacturing a storage capacitor for a liquid crystal display of the present invention without departing from the spirit or scope of the invention. Thus, it is intended that the present invention cover the modifications and variations of this invention provided they come within the scope of the appended claims and their equivalents.

What is claimed is:

1. A method for manufacturing a liquid crystal display device, the method comprising the steps of:
   forming a gate electrode and a gate bus line over a substrate;
   forming an insulating layer, including a combination of PbOx, $Bi_2O_3$, BaO, SrO, $TiO_2$, $Nb_2O_5$, ZnO, $Zr_2O_3$, and MgO, over the gate electrode, the gate bus line, and the substrate;
   forming a semiconductor layer on the insulating layer over the gate electrode;
   forming an ohmic contact layer having first and second portions on the semiconductor layer;
   forming source and drain electrodes on the first and second portions of the ohmic contact layer, respectively; and
   forming a pixel electrode contacting the drain electrode and over the insulating layer,
   wherein the steps of forming the gate bus line, the insulating layer, and the pixel electrode form a capacitor.

2. The method according to claim 1, further comprising the step of forming an oxide layer on the gate electrode and the gate bus line.

3. A liquid crystal display device comprising:
   a substrate;
   a gate electrode and a gate bus line over the substrate;
   an insulating layer, including a combination of PbOx, $Bi_2O_3$, BaO, SrO, $TiO_2$, $Nb_2O_5$, ZnO, $Zr_2O_3$, and MgO, over the gate electrode, the gate bus line, and the substrate;
   a semiconductor layer on the insulating layer over the gate electrode;
   an ohmic contact layer having first and second portions on the semiconductor layer;
   source and drain electrodes on the first and second portions of the ohmic contact layer, respectively; and
   a pixel electrode contacting the drain electrode and over the insulating layer,
   wherein the gate bus line, the insulating layer, and the pixel electrode form a capacitor for the liquid crystal display.

4. The liquid crystal display according to claim 3, further comprising an oxide layer on the gate electrode and the gate bus line.

5. A method for manufacturing a storage capacitor for a liquid crystal display device, the method comprising the steps of:
   forming a first electrode;
   forming a second electrode; and
   forming a dielectric layer between the first and second electrodes, the dielectric layer including a combination of PbOx, $Bi_2O_3$, BaO, SrO, $TiO_2$, $Nb_2O_5$, ZnO, $Zr_2O_3$, and MgO.

6. The method according to claim 5, further comprising the step of forming an oxide layer on the first electrode.

7. A storage capacitor for a liquid crystal display device comprising:
   a first electrode;
   a second electrode; and
   a dielectric layer between the first and second electrodes, the dielectric layer including a combination of PbOx, $Bi_2O_3$, BaO, SrO, $TiO_2$, $Nb_2O_5$, ZnO, $Zr_2O_3$, and MgO.

8. The storage capacitor according to claim 7, further comprising an oxide layer on the first electrode.

9. A method for manufacturing a liquid crystal display device, the method comprising the steps of:
   forming a gate electrode and a gate bus line over a substrate;
   forming an insulating layer, including at least one of PbOx, $Bi_2O_3$, SrO, $Nb_2O_5$, ZnO, $Zr_2O_3$, and MgO, over the gate electrode, the gate bus line, and the substrate;
   forming a semiconductor layer on the insulating layer over the gate electrode;
   forming an ohmic contact layer having first and second portions on the semiconductor layer;
   forming source and drain electrodes on the first and second portions of the ohmic contact layer, respectively; and
   forming a pixel electrode contacting the drain electrode and over the insulating layer, wherein the steps of forming the gate bus line, the insulating layer, and the pixel electrode form a capacitor.

10. The method according to claim 9, further comprising the step of forming an oxide layer on the gate electrode and the gate bus line.

11. A liquid crystal display device comprising:

a substrate;

a gate electrode and a gate bus line over the substrate;

an insulating layer, including at least one of PbOx, $Bi_2O_3$, SrO, $Nb_2O_5$, ZnO, $Zr_2O_3$, and MgO, over the gate electrode, the gate bus line, and the substrate;

a semiconductor layer on the insulating layer over the gate electrode;

an ohmic contact layer having first and second portions on the semiconductor layer;

source and drain electrodes on the first and second portions of the ohmic contact layer, respectively; and a pixel electrode contacting the drain electrode and over the insulating layer, wherein the gate bus line, the insulating layer, and the pixel electrode form a capacitor for the liquid crystal display.

12. The liquid crystal display according to claim 11, further comprising an oxide layer on the gate electrode and the gate bus line.

13. A method for manufacturing a storage capacitor for a liquid crystal display device, the method comprising the steps of:

forming a first electrode;

forming a second electrode; and forming a dielectric layer betveen the first and second electrodes, the dielectric layer including at least one of PbOx, $Bi_2O_3$, SrO, $Nb_2O_5$, ZnO, $Zr_2O_3$, and MgO.

14. The method according to claim 13, further comprising the step of forming an oxide layer on the first electrode.

15. A storage capacitor for a liquid crystal display device comprising:

a first electrode;

a second electrode; and a dielectric layer between the first and second electrodes, the dielectric layer including at least one of PbOx, $Bi_2O_3$, SrO, $Nb_2O_5$, ZnO, $Zr_2O_3$, and MgO.

16. The storage capacitor according to claim 15, further comprising an oxide layer on the first electrode.

17. A method for manufacturing a liquid crystal display device, the method comprising the steps of:

forming a gate electrode and a gate bus line over a substrate;

forming an insulating layer, including a combination of any two or more of PbOx, $Bi_2O_3$, SrO, $Nb_2O_5$, ZnO, $Zr_2O_3$, and MgO, over the gate electrode, the gate bus line, and the substrate;

forming a semiconductor layer on the insulating layer over the gate electrode;

forming an ohmic contact layer having first and second portions on the semiconductor layer;

forming source and drain electrodes on the first and second portions of the ohmic contact layer, respectively; and forming a pixel electrode contacting the drain electrode and over the insulating layer, wherein the steps of forming the gate bus line, the insulating layer, and the pixel electrode form a capacitor.

18. The method according to claim 17, wherein the step of forming the insulating layer includes the step of forming the insulating layer including a combination of all of PbOx, $Bi_2O_3$, SrO, $Nb_2O_5$, ZnO, $Zr_2O_3$, and MgO.

19. The method according to claim 17, further comprising the step of forming an oxide layer on the gate electrode and the gate bus line.

20. A liquid crystal display device comprising:

a substrate;

a gate electrode and a gate bus line over the substrate;

an insulating layer, including a combination of any two or more of PbOx, $Bi_2O_3$, SrO, $Nb_2O_5$, ZnO, $Zr_2O_3$, and MgO, over the gate electrode, the gate bus line, and the substrate;

a semiconductor layer on the insulating layer over the gate electrode;

an ohmic contact layer having first and second portions on the semiconductor layer;

source and drain electrodes on the first and second portions of the ohmic contact layer, respectively; and a pixel electrode contacting the drain electrode and over the insulating layer, wherein the gate bus line, the insulating layer, and the pixel electrode form a capacitor for the liquid crystal display.

21. The liquid crystal display according to claim 20, wherein the insulating layer includes a combination of all of PbOx, $Bi_2O_3$, SrO, $Nb_2O_5$, ZnO, $Zr_2O_3$, and MgO.

22. The liquid crystal display according to claim 20, further comprising an oxide layer on the gate electrode and the gate bus line.

23. A method for manufacturing a storage capacitor for a liquid crystal display device, the method comprising the steps of:

forming a first electrode;

forming a second electrode; and forming a dielectric layer between the first and second electrodes, the dielectric layer including a combination of any two or more of PbOx, $Bi_2O_3$, SrO, $Nb_2O_5$, ZnO, $Zr_2O_3$, and MgO.

24. The method according to claim 23, wherein the step of forming the dielectric layer includes the step of forming the dielectric layer including a combination of all of PbOx, $Bi_2O_3$, SrO, $Nb_2O_5$, ZnO, $Zr_2O_3$, and MgO.

25. The method according to claim 23, further comprising the step of forming an oxide layer on the first electrode.

26. A storage capacitor for a liquid crystal display device comprising:

a first electrode;

a second electrode; and a dielectric layer between the first and second electrodes, the dielectric layer including a combination of any two or more of PbOx, $Bi_2O_3$, SrO, $Nb_2O_5$, ZnO, $Zr_2O_3$, and MgO.

27. The storage capacitor according to claim 26, wherein the dielectric layer includes a combination of all of PbOx, $Bi_2O_3$, SrO, $Nb_2O_5$, ZnO, $Zr_2O_3$, and MgO.

28. The storage capacitor according to claim 26, further comprising an oxide layer on the first electrode.

* * * * *